United States Patent
Maiman et al.

(10) Patent No.: US 11,657,449 B2
(45) Date of Patent: May 23, 2023

(54) SYSTEMS AND METHODS FOR PREVENTING UNNECESSARY PAYMENTS

(71) Applicant: Capital One Services, LLC, McLean, VA (US)

(72) Inventors: Tyler Maiman, Melville, NY (US); Brendan Way, Brooklyn, NY (US); Abdelkader Benkreira, Washington, DC (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 17/375,022

(22) Filed: Jul. 14, 2021

(65) Prior Publication Data
US 2023/0013908 A1    Jan. 19, 2023

(51) Int. Cl.
*G06Q 40/02* (2023.01)
*G06Q 40/08* (2012.01)
(Continued)

(52) U.S. Cl.
CPC ......... *G06Q 40/02* (2013.01); *G06Q 30/0226* (2013.01); *G06Q 40/08* (2013.01);
(Continued)

(58) Field of Classification Search
None
See application file for complete search history.

(56) References Cited

U.S. PATENT DOCUMENTS

| 8,712,803 B1 | 4/2014 | Buentello |
| 2002/0143585 A1* | 10/2002 | Kodama ................ G06Q 40/08 705/4 |

(Continued)

FOREIGN PATENT DOCUMENTS

WO    2020130970 A1    6/2020

OTHER PUBLICATIONS

Paytm to introduce new features to prevent credit card misuse in add money. (Mar, 10, 2017). Asian News International Retrieved from https://dialog.proquest.com/professional/docview/1875700747?accountid=131444 Jan. 20, 2023 (Year: 2017).*

*Primary Examiner* — Kito R Robinson
(74) *Attorney, Agent, or Firm* — Troutman Pepper Hamilton Sanders LLP; Christopher J. Forstner; John A. Morrissett

(57) ABSTRACT

A system may include processor(s), a memory in communication with the processor(s), and storing instructions, that when executed by the processor(s), are configured to cause the system to prevent unnecessary payments. The system may receive a signal indicative of an event in which a user device associated with a user enters a geofenced area associated with a merchant. The system may identify a merchant category code (MCC) associated with the merchant, and determine whether benefit(s) related to the MCC are associated with account(s) of the user. The system may receive an attempted purchase associated with the merchant, and may determine whether the attempted purchase relates to the benefit(s). The system may automatically block the attempted purchase related to the benefit(s) and associated with the user, and may transmit a message to the user via the user device, the message providing the benefit(s).

19 Claims, 5 Drawing Sheets

(51) Int. Cl.
*G06Q 50/14* (2012.01)
*H04W 4/021* (2018.01)
*G06Q 30/0226* (2023.01)
G06N 20/00 (2019.01)
G07C 9/00 (2020.01)
G06Q 20/40 (2012.01)

(52) U.S. Cl.
CPC ............ *G06Q 50/14* (2013.01); *H04W 4/021* (2013.01); *G06N 20/00* (2019.01); *G06Q 20/405* (2013.01); *G07C 9/00* (2013.01)

(56) References Cited

U.S. PATENT DOCUMENTS

| | | | |
|---|---|---|---|
| 2008/0197185 A1* | 8/2008 | Cronin | G06Q 20/387 235/375 |
| 2012/0030109 A1* | 2/2012 | Dooley Maley | G06Q 20/2295 705/44 |
| 2015/0095130 A1* | 4/2015 | Benjamin | G06Q 30/0226 705/14.27 |

* cited by examiner

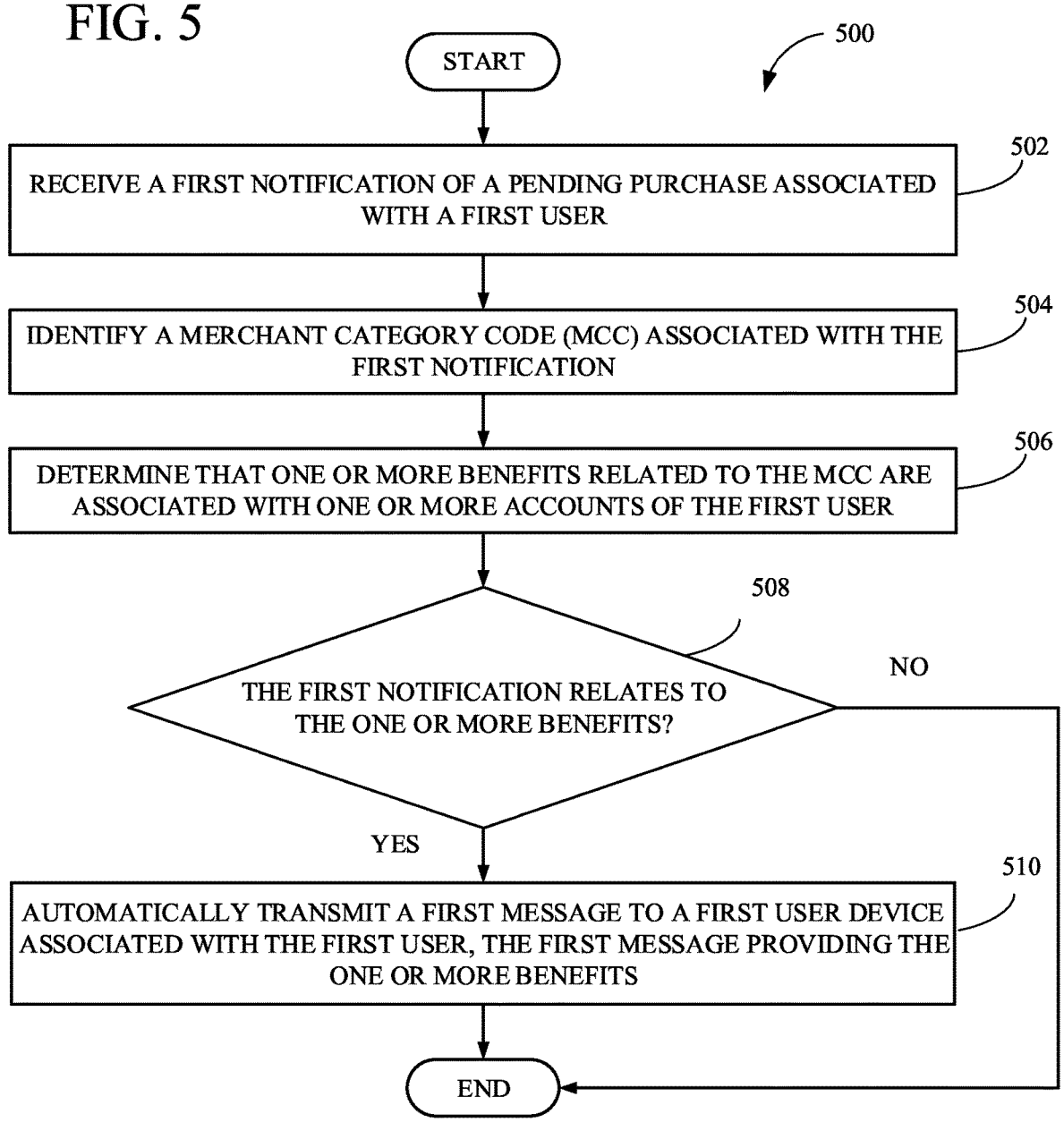

SYSTEMS AND METHODS FOR PREVENTING UNNECESSARY PAYMENTS

FIELD

The disclosed technology relates to systems and methods for preventing unnecessary payments, and more particularly for automatically blocking payments for benefits a user already receives in association with one or more of the user's accounts.

BACKGROUND

User policies, such as those associated with debit or credit card accounts, typically come with a variety of added benefits or features, for example cash back, rewards, travel miles, insurance coverage, etc. Many times, however, users do not always realize the full extent of their policy benefits. As such, there may be situations where users end up making unnecessary payments for benefits to which they are already entitled through at least one of their account policies. Traditional systems and methods require users to manually sort through their policies to understand their entitled benefits or features, which can often lead to a lack of full user knowledge or understanding, and ultimately, unnecessary benefits payments.

Accordingly, there is a need for improved systems and methods that identify the benefits or features included in a user's policies, and automatically block the user from purchasing any benefit or feature to which the user is already entitled. Embodiments of the present disclosure are directed to this and other considerations.

SUMMARY

Disclosed embodiments provide systems and methods for preventing unnecessary payments that identify when a user may be looking to make a purchase associated with a benefit, and automatically block the user from making the purchase if the user is already entitled to that benefit in association with one or more of the user's accounts.

Consistent with the disclosed embodiments, a system may include one or more processors and a memory in communication with the one or more processors and storing instructions, that when executed by the one or more processors, are configured to cause the system to perform a method for preventing unnecessary payments. For example, the system may receive a signal (e.g., a Global Positioning System (GPS) signal, a Radio Frequency Identification (RFID) signal, a WiFi signal, a cellular device data signal, etc.) indicative of a first event in which a first user device associated with a first user enters a geofenced area associated with a first merchant. Responsive to receiving the signal, the system may identify a merchant category code (MCC) associated with the first merchant, and may determine whether one or more benefits related to the MCC (e.g., rewards, travel miles, insurance coverage, etc.) are associated with one or more accounts (e.g., a debit account, credit card account, etc.) of the first user. Responsive to determining one or more benefits related to the MCC are associated with the one or more accounts of the first user, the system may receive an attempted purchase associated with the first merchant. The system may also determine whether the attempted purchase relates to the one or more benefits. Responsive to determining that the attempted purchase relates to the one or more benefits, the system may automatically block the attempted purchase related to the one or more benefits and associated with the first user, and may transmit a message to the first user via the first user device, the message providing the one or more benefits. This embodiment provides a benefit of preventing an unnecessary or duplicative payment while in a physical merchant location (e.g., a merchant store), and providing the user with follow-up information regarding why the payment may be unnecessary based on the user's already entitled benefits.

In another embodiment, a system may include one or more processors and a memory in communication with the one or more processors and storing instructions, that when executed by the one or more processors, are configured to cause the system to perform a method for preventing unnecessary payments. For example, the system may receive a signal (e.g., via a Google Chrome plugin) indicative of a first event in which a first user device associated with a first user navigates to a webpage of a first merchant. Responsive to receiving the signal, the system may identify an MCC associated with the first merchant, and may determine whether one or more benefits related to the MCC are associated with one or more accounts of the first user. Responsive to determining the one or more benefits related to the MCC are associated with the one or more accounts of the first user, the system may identify whether the webpage comprises one or more first options associated with the one or more benefits. Responsive to determining the webpage comprises the one or more first options associated with the one or more benefits, the system may automatically block the first user from selecting the one or more first options, and may transmit a first message to the first user via the first user device, the first message providing the one or more benefits. This embodiment provides the added benefit of preventing an unnecessary or duplicative payment while a user is shopping online, and providing the user with follow-up information regarding why the payment may be unnecessary based on the user's already entitled benefits.

In another embodiment, a system may include one or more processors and a memory in communication with the one or more processors and storing instructions, that when executed by the one or more processors, are configured to cause the system to perform a method for preventing unnecessary payments. For example, the system may receive a first notification of a pending purchase associated with a first user. The system may identify an MCC associated with the first notification. The system may determine that one or more benefits related to the MCC are associated with one or more accounts of the first user. The system may then determine whether the first notification relates to the one or more benefits. Responsive to determining the first notification relates to the one or more benefits, the system may automatically transmit a first message to a first user device associated with the first user, the first message providing the one or more benefits. This embodiment provides the added benefit of providing the user with follow-up information regarding why the pending payment may be unnecessary based on the user's already entitled benefits such that the user may be able to call off or cancel the pending payment before the user is charged.

Further implementations, features, and aspects of the disclosed technology, and the advantages offered thereby, are described in greater detail hereinafter, and can be understood with reference to the following detailed description, accompanying drawings, and claims.

BRIEF DESCRIPTION OF THE DRAWINGS

Reference will now be made to the accompanying drawings, which are not necessarily drawn to scale, and which illustrate various implementations, aspects, and principles of the disclosed technology. In the drawings:

FIG. 5 is a flowchart of a method for preventing unnecessary payments, in accordance with some embodiments of the present disclosure.

DETAILED DESCRIPTION

Figure 1:
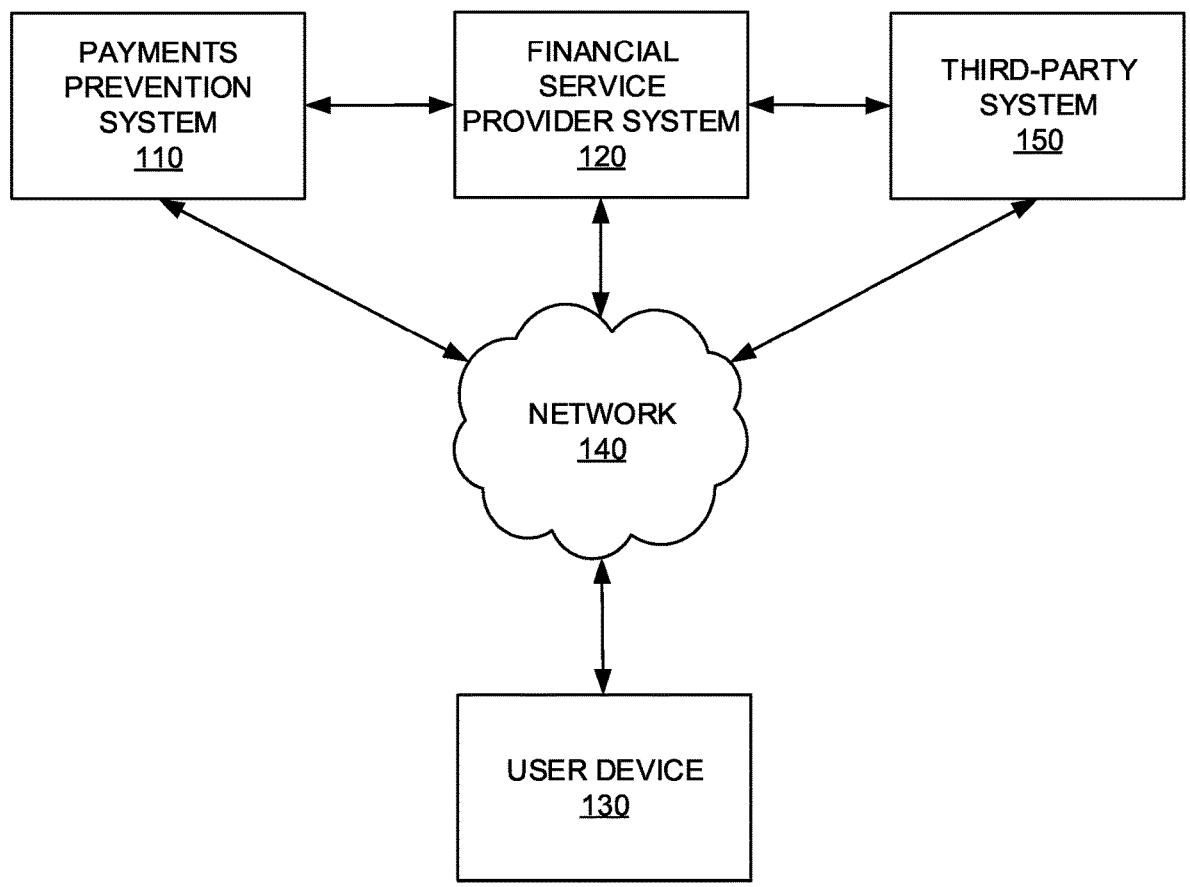
FIG. 1 is a block diagram of an example system environment that may be used to implement one or more embodiments of the present disclosure.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

By way of introduction, aspects discussed herein may relate to systems and methods for preventing unnecessary payments. For example, some embodiments describe identifying that a user may be close to making a purchase from a merchant of a benefit to which the user is already entitled via one of the user's own policies, and automatically blocking the user from making the purchase. These provide advantages over other systems and methods by protecting users from making duplicative or unnecessary payments when users are not fully aware of their own policy benefits or features. The disclosed systems and methods specifically provide improvements to the functioning of computing devices, such as mobile devices, through the performance of real-time, automatic searching of user account policies to identify included benefits and features. Rather than having to manually scan through account policies, users can rely on the disclosed systems and methods not only for alerting the users to potentially duplicative payments based on account policy benefits, but also for automatically blocking users from making these unnecessary purchases to begin with. For similar reasons, these systems and methods also provide improvements to the fields of personal banking and financial systems as a whole as they provide for real-time automation of unnecessary purchase prevention, that would otherwise require merchant and human upkeep. As such, the following discussion describes several exemplary systems and methods for automatically blocking unnecessary benefits payments.

Reference will now be made in detail to example embodiments of the disclosed technology that are illustrated in the accompanying drawings and disclosed herein. Wherever convenient, the same reference numbers will be used throughout the drawings to refer to the same or like parts.

FIG. 1 is a diagram of an example system environment that may be used to implement one or more embodiments of the present disclosure. The components and arrangements shown in FIG. 1 are not intended to limit the disclosed embodiments as the components used to implement the disclosed processes and features may vary.

In accordance with disclosed embodiments, system 100 may include a payments prevention system 110 (as will be discussed in more detail below with reference to FIG. 2) that may be in communication (either directly or via a network 140) with a financial service provider system 120. System 100 may also include a user device 130 that may be in communication (either directly or via a network 140) with each other, financial service provider system 120, and/or payments prevention system 110. System 100 may also include a third-party system 150, for example, owned and/or operated by an external entity (e.g., a car rental merchant).

In certain embodiments, financial service provider system 120 may store and/or have access to detailed customer information, such as debit or credit card accounts and policies. Financial service provider system 120 may communicate with payments prevention system 110 to correlate compiled data, analyze the compiled data, arrange the compiled data, generate derived data based on the compiled data, and store the compiled and derived data in a database. Financial service provider system 120 may also communicate with payments prevention system 110 to provide one or more GUI displays to enable user device 130 to input data, search for data, transfer data, and transmit and receive payments.

User device 130 may be a mobile computing device (e.g., a smart phone, tablet computer, smart wearable device, portable laptop computer, voice command device, wearable augmented reality device, or other mobile computing device), a stationary device (e.g., desktop computer), or any other device capable of communicating with network 140 and ultimately communicating with one or more components of system 100. In some embodiments, user device 130 may include or incorporate electronic communication devices for hearing or vision impaired users. User device 130 may be operated by a user, which may include individuals such as, for example, subscribers, clients, prospective clients, or customers of an entity associated with an organization, such as individuals who have obtained, will obtain, or may obtain a product, service, or consultation from an entity associated with system 100. According to some embodiments, user device 130 may include an environmental sensor for obtaining audio or visual data, such as a microphone and/or digital camera, a geographic location sensor for determining the location of the device, an input/output ("I/O") device such as a transceiver for sending and receiving data, a display for displaying digital images, one or more processors including a sentiment depiction processor, and a memory in communication with the one or more processors.

In accordance with certain embodiments, user device 130 may also be in communication with third-party system 150 via network 140. In certain embodiments, third-party system 150 may include a computer system associated with an entity (other than the entity associated with system 100 and its users) that performs one or more functions associated with the users.

Network 140 may be of any suitable type, including individual connections via the internet such as cellular or WiFi networks. In some embodiments, network 140 may connect terminals, services, and mobile devices using direct connections such as RFID, near-field communication (NFC), Bluetooth™, low-energy Bluetooth™ (BLE), WiFi™, ZigBee™, ambient backscatter communications (ABC) protocols, USB, WAN, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

Figure 2:
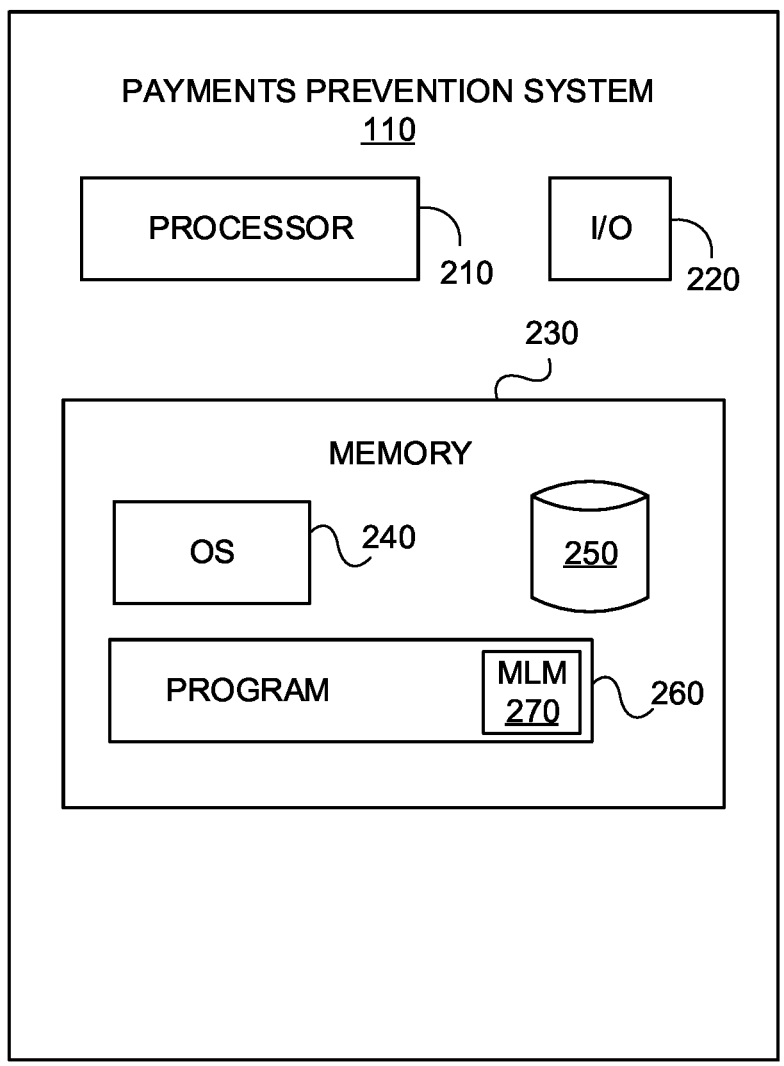
FIG. 2 is a component diagram of a payments prevention system in accordance with some embodiments of the present disclosure.

An example embodiment of payments prevention system 110 is shown in more detail in FIG. 2. As shown, payments prevention system 110 may include a processor 210, an I/O device 220, a memory 230 containing an operating system ("OS") 240, a database 250, and a program 260. In some embodiments, program 260 may include a machine learning model ("MLM") 270 that may be trained, for example, to recognize customer behavior patterns (and deviations from typical patterns) based on past and/or pending credit card purchases, purchase location data, and/or other available information. In certain implementations, MLM 270 may issue commands in response to processing an event, in accordance with a model that may be continuously or intermittently updated. Moreover, processor 210 may execute one or more programs (such as via a rules-based platform or the trained MLM 270), that, when executed, perform functions related to disclosed embodiments.

Payments prevention system 110 may be a single server or may be configured as a distributed computer system including multiple servers or computers that interoperate to perform one or more of the processes and functionalities associated with the disclosed embodiments. In some embodiments, payments prevention system 110 may further include a peripheral interface, a transceiver, a mobile network interface in communication with processor 210, a bus configured to facilitate communication between the various components of payments prevention system 110, and a power source configured to power one or more components of payments prevention system 110. A peripheral interface may include the hardware, firmware and/or software that enables communication with various peripheral devices, such as media drives (e.g., magnetic disk, solid state, or optical disk drives), other processing devices, or any other input source used in connection with the instant techniques. In some embodiments, a peripheral interface may include a serial port, a parallel port, a general-purpose input and output (GPIO) port, a game port, a universal serial bus (USB), a micro-USB port, a high definition multimedia (HDMI) port, a video port, an audio port, a Bluetooth™ port, an NFC port, another like communication interface, or any combination thereof.

In some embodiments, a transceiver may be configured to communicate with compatible devices and ID tags when they are within a predetermined range. A transceiver may be compatible with one or more of: RFID, NFC, Bluetooth™, BLE, WiFi™, ZigBee™, ambient backscatter communications (ABC) protocols or similar technologies.

A mobile network interface may provide access to a cellular network, the Internet, or another wide-area network. In some embodiments, a mobile network interface may include hardware, firmware, and/or software that allows processor 210 to communicate with other devices via wired or wireless networks, whether local or wide area, private or public, as known in the art. A power source may be configured to provide an appropriate alternating current (AC) or direct current (DC) to power components.

As described above, payments prevention system 110 may be configured to remotely communicate with one or more other devices, such as user device 130.

Processor 210 may include one or more of a microprocessor, microcontroller, digital signal processor, co-processor or the like or combinations thereof capable of executing stored instructions and operating upon stored data. Memory 230 may include, in some implementations, one or more suitable types of memory (e.g., volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like) for storing files, including an operating system, application programs (including, e.g., a web browser application, a widget or gadget engine, or other applications, as necessary), executable instructions, and data. In one embodiment, the processing techniques described herein are implemented as a combination of executable instructions and data within memory 230.

Processor 210 may be one or more known processing devices, such as a microprocessor from the Pentium™ family manufactured by Intel™ or the Turion™ family manufactured by AMD™. Processor 210 may constitute a single core or multiple core processor that executes parallel processes simultaneously. For example, processor 210 may be a single core processor that is configured with virtual processing technologies. In certain embodiments, processor 210 may use logical processors to simultaneously execute and control multiple processes. Processor 210 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

Payments prevention system 110 may include one or more storage devices configured to store information used by processor 210 (or other components) to perform certain functions related to the disclosed embodiments. In one example, payments prevention system 110 may include memory 230 that includes instructions to enable processor 210 to execute one or more applications, such as server applications, network communication processes, and any other type of application or software known to be available on computer systems. Alternatively, the instructions, application programs, etc., may be stored in an external storage or available from a memory over a network. The one or more storage devices may be a volatile or non-volatile, magnetic, semiconductor, tape, optical, removable, non-removable, or other type of storage device or tangible computer-readable medium.

In one embodiment, payments prevention system 110 may include memory 230 that includes instructions that, when executed by processor 210, perform one or more processes consistent with the functionalities disclosed herein. Methods, systems, and articles of manufacture consistent with disclosed embodiments are not limited to separate programs or computers configured to perform dedicated tasks. For example, payments prevention system 110 may include memory 230 that may include one or more programs 260 to perform one or more functions of the disclosed embodiments. Moreover, processor 210 may execute one or more programs 260 located remotely from payments prevention system 110. For example, payments prevention system 110 may access one or more remote programs 260, that, when executed, perform functions related to disclosed embodiments.

Memory 230 may include one or more memory devices that store data and instructions used to perform one or more features of the disclosed embodiments. Memory 230 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational databases. Memory 230 may include software components that, when executed by processor 210, perform one or more processes consistent with the disclosed embodiments. In some embodiments, memory 230 may include database 250 for storing related data to enable payments prevention system 110 to perform one or more of the processes and functionalities associated with the disclosed embodiments.

Payments prevention system 110 may also be communicatively connected to one or more memory devices (e.g., databases (not shown)) locally or through a network. The remote memory devices may be configured to store information and may be accessed and/or managed by payments prevention system 110. By way of example, the remote memory devices may be document management systems, Microsoft™ SQL database, SharePoint™ databases, Oracle™ databases, Sybase™ databases, or other relational databases. Systems and methods consistent with disclosed embodiments, however, are not limited to separate databases or even to the use of a database.

Payments prevention system 110 may also include one or more I/O devices 220 that may include one or more interfaces for receiving signals or input from devices and providing signals or output to one or more devices that allow data to be received and/or transmitted by payments prevention system 110. For example, payments prevention system 110 may include interface components, which may provide interfaces to one or more input devices, such as one or more keyboards, mouse devices, touch screens, track pads, trackballs, scroll wheels, digital cameras, microphones, sensors, and the like, that enable payments prevention system 110 to receive data from one or more users (such as via user device 130).

In example embodiments of the disclosed technology, payments prevention system 110 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

While payments prevention system 110 has been described as one form for implementing the techniques described herein, those having ordinary skill in the art will appreciate that other, functionally equivalent techniques may be employed. For example, as known in the art, some or all of the functionality implemented via executable instructions may also be implemented using firmware and/or hardware devices such as application specific integrated circuits (ASICs), programmable logic arrays, state machines, etc. Furthermore, other implementations may include a greater or lesser number of components than those illustrated.

Figure 3:
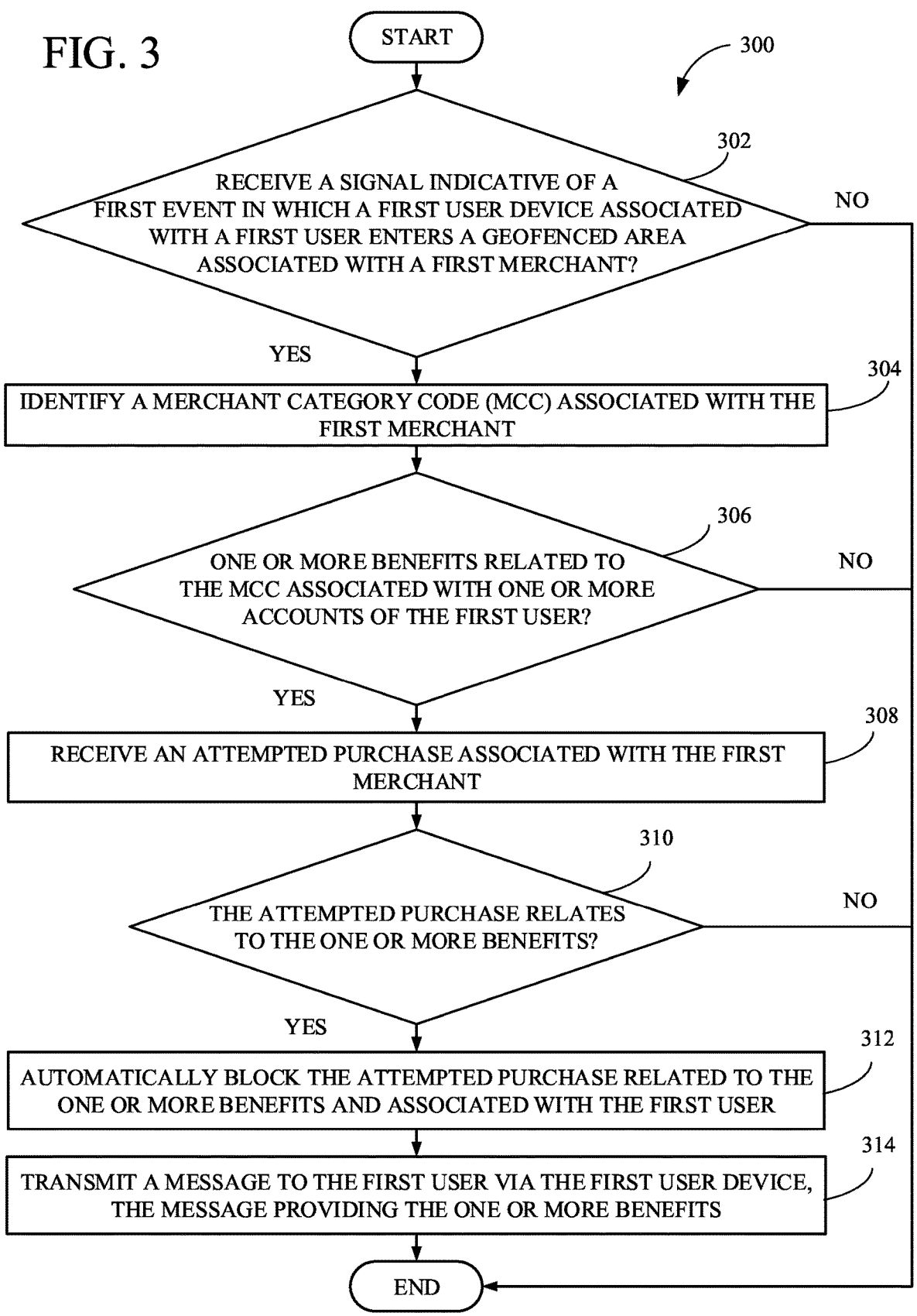
FIG. 3 is a flowchart of a method for preventing unnecessary payments, in accordance with some embodiments of the present disclosure.

FIG. 3 shows a flowchart of a method 300 for preventing unnecessary payments. Method 300 may be performed by system 100 via payments prevention system 110, financial service provider system 120, user device 130, and/or third-party system 150. While each step of method 300 may be described as being performed by one of these components specifically, it should be assumed that each step could be performed by one or more of the other components.

In block 302, the system (e.g., via payments prevention system 110) may determine whether it has received a signal indicative of a first event in which a first user device (e.g., user device 130) associated with a first user enters a geofenced area associated with a first merchant. The signal may comprise, for example, a GPS signal, an RFID signal, a wireless network protocol (e.g., WiFi™), or a cellular device data signal. In some embodiments, the system may determine that the first user device is within the geofenced area based on a connection to a wireless network. For example, the first user device may connect to a wireless network associated with the first merchant, e.g., a car rental merchant.

In block 304, in response to receiving the signal, the system (e.g., via payments prevention system 110) may identify an MCC associated with the first merchant. For example, the MCC may allow the system to distinguish the general type of goods and/or services provided by the first merchant, e.g., car rental, travel services, food services, clothing goods, etc.

In block 306, the system (e.g., via payments prevention system 110) may determine whether one or more benefits related to the MCC are associated with one or more accounts of the first user. For example, the first user may have a debit account and a credit card account with a financial services provider (e.g., Capital One). The debit and credit card accounts may each come with one or more benefits or features, such as cash back, rewards, shopping points, travel miles, insurance coverage, etc., that the system may recognize as being related to the identified MCC. For example, the system may have identified the first merchant being associated with car rental services. The system may then determine that the first user's credit card account provides a benefit of car rental insurance for the first user.

In block 308, in response to determining the one or more benefits related to the MCC are associated with the one or more accounts of the first user, the system (e.g., via financial service provider system 120) may receive an attempted purchase associated with the first merchant. For example, the system may recognize the first user has initiated payment for a car rental by swiping his or her credit card at a point-of-sale (POS) terminal of a car rental merchant. The system, e.g., via financial service provider system 120, may receive a transaction notification for authorizing the attempted purchase.

In block 310, the system (e.g., via payments prevention system 110) may determine whether the attempted purchase relates to the one or more benefits. For example, the system may determine whether the first user's attempted purchase of renting a car relates to the one or more benefits associated with the first user's debit and/or credit card account. As described above, these benefits may be related to rewards or shopping points with the car rental merchant (e.g., Hertz, Enterprise, Avis, etc.). These related benefits may also be add-ons related to car renting, e.g., car rental insurance.

In block 312, in response to determining that the attempted purchase relates to the one or more benefits, the system (e.g., via payments prevention system 110) may automatically block the attempted purchase related to the one or more benefits and associated with the first user. For example, when the system receives the first user's attempted car rental purchase, e.g., via an authorization system of financial service provider system 120, and the system already determined the first user is entitled to car rental rewards or points and/or car rental insurance, the system may decline to authorize the attempted purchase. The advantage of this feature is that the first user may not know he or she is entitled to rewards and/or rental insurance through the car rental merchant, e.g., Hertz. The system may thus be protecting the first user against making a duplicative or unnecessary payment. In some embodiments, the system may be configured to offer this automatic blocking of payments as a feature of the first user's account. For example, the first user may have previously called his or her credit card company or logged into his or her online credit card account profile, to enroll in this service to allow the system to perform such automatic blocking of payments.

In block 314, the system (e.g., via payments prevention system 110) may transmit a message to the first user via the first user device (e.g., user device 130), the message providing the one or more benefits. The message may comprise, for example, an email, an SMS message, a push notification, and/or an in-application message. The message may alert the first user that the attempted purchase has been blocked because the first user may already be entitled to one or more related benefits or features. For example, the system may send an SMS message to the first user's mobile device informing the first user that the attempted purchase of a rental car was blocked because the policy associated with the first user's credit card account already entitles the first user to car rental rewards and/or rental insurance. In some embodiments, the first user may have pre-selected the format of message he or she would prefer to receive. For example, the first user may have logged into his or her online credit card account profile and entered a preference to receive SMS messages via a specified mobile device.

In some embodiments, the message may comprise an option for the first user to prevent the system from automatically blocking the attempted purchase. For example, the system may send an SMS message to the first user's mobile device, where the SMS message includes a link for the first user to select if the first user would rather the system not block the attempted purchase. Such case may be, for example, because the system incorrectly identified one or more related benefits and/or the first user is already familiar with the one or more benefits included in the first user's one or more account policies. Further, in some instances, the system may have, for example, recognized the attempted purchase was for purchasing a rental car; however, the system may not have been able to differentiate whether the attempted car rental purchase included the added benefit of car rental insurance. If the attempted car rental purchase did not in fact include car rental insurance, but the system attempted to automatically block the attempted purchase because the system identified the first user was already entitled to car rental insurance through the first user's credit card account, the first user would thus have the option to prevent the system from unnecessarily blocking the first user's purchase of the rental car alone.

Figure 4:
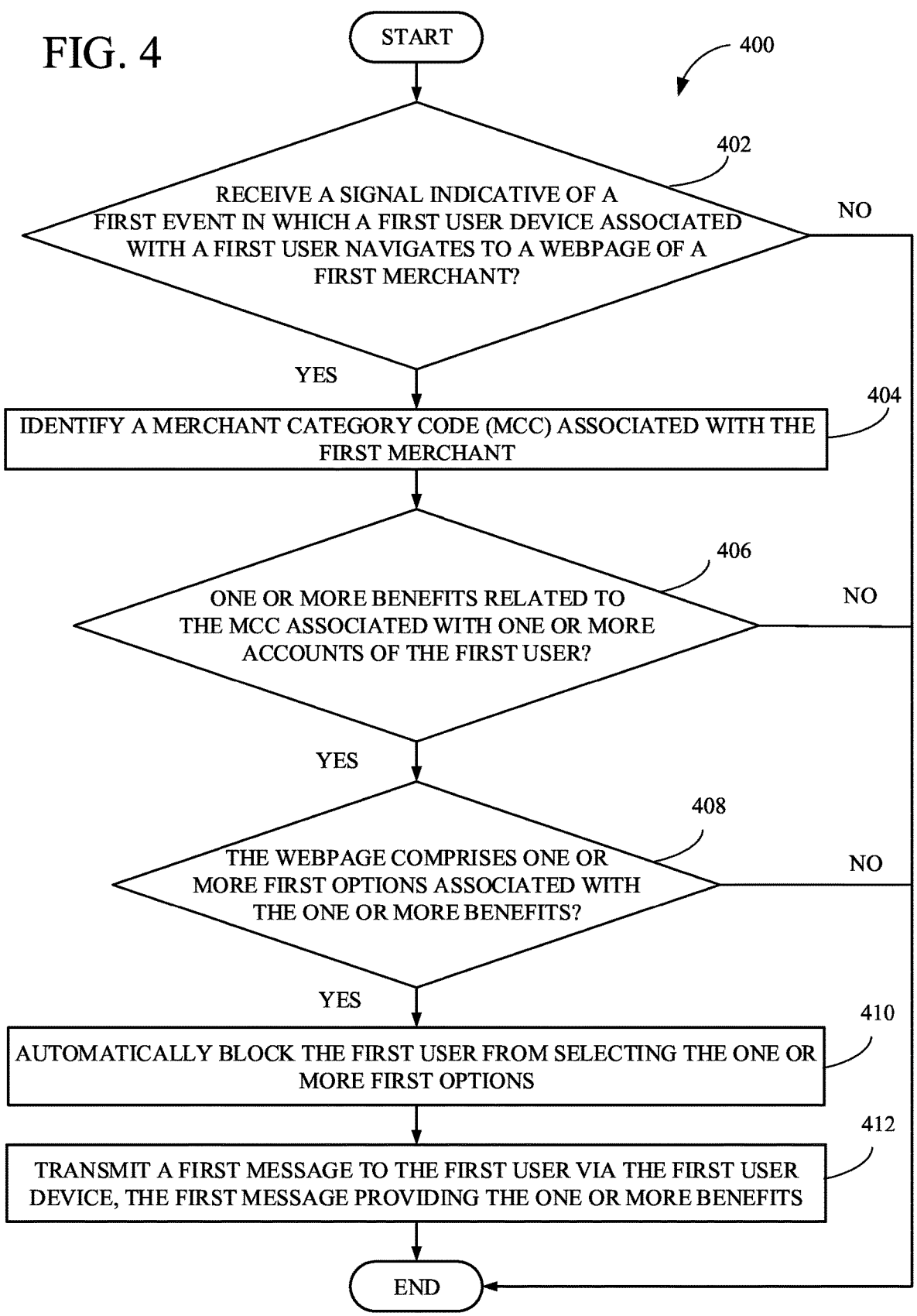
FIG. 4 is a flowchart of a method for preventing unnecessary payments, in accordance with some embodiments of the present disclosure.

FIG. 4 shows a flowchart of a method 400 for preventing unnecessary payments. Method 400 may also be performed by system 100 via payments prevention system 110, financial service provider system 120, user device 130, and/or third-party system 150. It should also be assumed that while each step of method 400 may be described as being performed by one of these components specifically, each step could be performed by one or more of the other components. Method 400 is similar to method 300 of FIG. 3 except that method 400 includes blocks 402, 408, and 410. The descriptions of blocks 404, 406, and 412 of method 400 are the same as or similar to the respective descriptions of blocks 304, 306, and 314 of method 300, and as such, are not repeated herein for brevity.

In block 402 of FIG. 4, the system (e.g., via payments prevention system 110) may determine whether it has received a signal indicative of a first event in which a first user device (e.g., user device 130) associated with a first user navigates to a webpage of a first merchant. In some embodiments, the first user may have previously downloaded and installed a browser plugin (e.g., a Google Chrome plugin) affiliated with the system to automatically identify when the first user, e.g., via the first user's laptop computer, navigates to a merchant website (e.g., the Hertz car rental website).

In block 408 of FIG. 4, the system (e.g., via payments prevention system 110) may determine whether the webpage comprises one or more first options associated with the one or more benefits. In some embodiments, the system's browser plugin may be configured to recognize when a webpage comprises one or more selectable data fields or user inputs for the first user to select one or more benefits or features. For example, the browser plugin may recognize the first user is on the Hertz car rental website, which may comprise individual selectable data fields or entries for, e.g., a car size upgrade, car rental insurance, a navigation system (e.g., GPS), a child car seat, etc.

In block 410 of FIG. 4, in response to determining the webpage comprises the one or more first options associated with the one or more benefits, the system (e.g., via payments prevention system 110) may automatically block the first user from selecting the one or more first options. For example, if the system has already recognized, e.g., that the first user's credit card account policy entitles the first user to car rental insurance, the system may block the first user from selecting the "car rental insurance" data field or entry. In some embodiments, automatically blocking the first user from selecting the one or more first options may comprise greying out one or more data fields on the webpage. In the above example, the system may be configured to grey out the "car rental insurance" data field or entry such that the first user may not click on or type into that selectable button or data field.

In some embodiments, the system may receive a notification of a pending purchase made by the first user, the pending purchase associated with the first merchant. For example, the first user may have selected one or more options to purchase one or more benefits that were not automatically blocked by the system. As another example, the first user may have previously selected an option to prevent the system from automatically blocking the first user from selecting one or more options on the webpage (e.g., via the first transmitted message as described above with respect to block 314 of FIG. 3). In such cases, the system may receive a notification of the pending purchase made by the first user via, e.g., an authorization system of financial service provider system 120. In response to receiving this notification, the system may automatically transmit a second message to the first user device, the second message providing a suggestion that the first user may have made an unnecessary payment and again providing the one or more benefits potentially related to the first user's purchase. Transmitting the second message provides an advantage of alerting the first user that he or she may have initiated a duplicative or unnecessary payment in the event the first user did not understand the first message or made the purchase otherwise inadvertently. The second message may be formatted similarly or differently from the first message, as described above with respect to block 314 of FIG. 3.

FIG. 5 shows a flowchart of a method 500 for preventing unnecessary payments. Method 500 may also be performed by system 100 via payments prevention system 110, financial service provider system 120, user device 130, and/or third-party system 150. It should also be assumed that while each step of method 500 may be described as being performed by one of these components specifically, each step could be performed by one or more of the other components. Method 500 is similar to method 300 of FIG. 3 except that method 500 includes blocks 502 and 508. The descriptions of blocks 504, 506, and 510 of method 500 are the same as or similar to the respective descriptions of blocks 304, 306, and 314 of method 300, and as such, are not repeated herein for brevity.

In block 502 of FIG. 5, the system may receive a first notification of a pending purchase associated with a first user. For example, the system, via financial service provider system 120, may receive a transaction notification through a transaction authorization system. That is, the first user may have, e.g., a credit card account affiliated with financial service provider system 120 such that the system may recognize when the first user has made a payment using the first user's credit card.

In block 508 of FIG. 5, the system (e.g., via payments prevention system 110) may determine whether the first notification relates to the one or more benefits. That is, the first notification may comprise, e.g., a description or key terms related to the pending purchase. For example, the system, via financial service provider system 120, may receive a merchant name, MCC, and/or merchant location associated with the pending purchase. The system may then, having already identified the one or more related benefits (as described above with respect to block 306 of FIG. 3), determine whether any part of the notification description relates to the one or more benefits. For example, the system may receive a notification that the first user may have made a car rental purchase if the merchant name listed in the transaction description is, e.g., Hertz. The system may then determine that the pending purchase with Hertz relates to the first user's car rental insurance benefit to which the first user is entitled via the first user's credit card account policy.

In some embodiments, the system may receive a second notification indicating the pending purchase was completed. That is, the system, via financial service provider system 120, may have authorized the initiated transaction, changing the purchase status from a "pending" status to a "posted" status, if the system did not recognize any issue with the pending transaction or receive any communication from the first user or the first merchant to cancel the pending transaction. In such case, the system may transmit a second message to the first user device, the second message providing a suggestion that the first user may have made an unnecessary payment and again providing the one or more benefits potentially related to the first user's purchase, as described above with respect to block 410 of FIG. 4.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology are described above with reference to customer devices that may include mobile computing devices. Those skilled in the art will recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Example Use Cases

The following example use cases describe examples of a typical user flow pattern. They are intended solely for explanatory purposes and not in limitation.

In one example, a user might walk into a car rental store to rent a car. The system may identify that the user has walked into the car rental store, e.g., Hertz, by receiving a GPS signal via the user's mobile device. Responsive to receiving that signal, the system may identify an MCC associated with Hertz. The system may then identify that the user has both a debit card account and a credit card account associated with a financial services provider, e.g., Capital One. The system may retrieve the one or more policies associated with the debit and credit card accounts to determine whether any associated policy includes any benefits or features that may be related to Hertz's MCC. That is, the system may recognize that as part of the user's credit card account policy, the user is already covered by car rental insurance. The user may then attempt to rent a car from Hertz by swiping the user's credit card through one of Hertz's POS terminals. The system may receive a notification of this attempted purchase, and may also determine that this attempted purchase to rent a car is related to the user's credit card policy benefit of car rental insurance. The system may then automatically block the user's attempted purchase, e.g., by denying the user's credit card for making the purchase. The user may then immediately get a message via the user's mobile device alerting the user that because his credit card account policy includes car rental insurance, this transaction has been blocked to prevent a potentially duplicative or unnecessary purchase. If the user had included car rental insurance when attempting to purchase the rental car, perhaps not knowing he was already covered through his credit card account policy, the user may then be able to modify the user's purchase to remove the selected car rental insurance from the user's car rental purchase. If the user had not included car rental insurance when attempting to purchase the rental car, or had included a different type of insurance that perhaps the user was aware was not part of his credit card policy's provided car rental insurance benefit, the user could click on a link provided in the message to prevent the system from denying the transaction. The user could then complete his rental car purchase.

In another example, a user may use her personal laptop computer to navigate to a car rental website, e.g., hertz.com. The system may identify that the user has navigated to the Hertz website via a browser plugin (e.g., a Google Chrome plugin) that the user had previously installed on her laptop. Responsive to receiving that signal, the system may identify an MCC associated with Hertz. The system may then identify that the user has a credit card account associated with a financial services provider, e.g., Synchrony. The system may retrieve one or more policies associated with the credit card account to determine whether any associated policy includes any benefits or features that may be related to Hertz's MCC. That is, the system may recognize that as part of the user's credit card account policy, the user is entitled to car rental insurance. The system may then identify whether the webpage comprises, e.g., a selectable user input or data field associated with adding rental insurance to the user's selected car rental purchase. If the system identifies that the webpage does comprise some user input associated with adding rental insurance, the system may automatically block the user from selecting the rental insurance add-on. For example, the browser plugin may be configured to grey out the user input associated with the rental insurance add-on such that the user may not click on or enter information into that user input field. The user may then immediately get a message via a pop-up notification on an interface of the user's laptop alerting the user that because her credit card account policy already entitles her to rental insurance, this transaction has been blocked to prevent a potentially duplicative or unnecessary purchase. If the user would rather the system not block the selection of this add-on at this time, the user could click on, e.g., a link in the pop-up notification to prevent the system from greying out the rental insurance add-on. The user could then complete her car rental purchase including the rental insurance add-on.

What is claimed is:

1. A system for preventing unnecessary payments, comprising:
    one or more processors; and
    a memory in communication with the one or more processors and storing instructions that, when executed by the one or more processors, are configured to cause the system to:
        receive a signal indicative of a first event in which a first user device associated with a first user navigates to a webpage of a first merchant;
        responsive to receiving the signal:
            identify a merchant category code (MCC) associated with the first merchant;
            determine whether one or more benefits related to the MCC are associated with one or more accounts of the first user;
            responsive to determining one or more benefits related to the MCC are associated with the one or more accounts of the first user:
                receive an attempted purchase associated with the first merchant;
                determine whether the attempted purchase relates to the one or more benefits;
                responsive to determining that the attempted purchase relates to the one or more benefits:
                    modify a graphical user interface (GUI) of the first user device to generate a modified GUI by re-formatting one or more selectable user input objects in the GUI from a first format to a second format;
                    cause the first user device to display the modified GUI;
                    automatically block the attempted purchase related to the one or more benefits and associated with the first user; and
                    transmit a message to the first user via the first user device, the message providing the one or more benefits.

2. The system of claim 1, wherein the message comprises one or more of an email, an SMS message, a push notification, an in-application message, or combinations thereof.

3. The system of claim 1, wherein the message comprises an option for the first user to prevent the system from automatically blocking the attempted purchase.

4. The system of claim 1, wherein the attempted purchase is associated with purchasing insurance.

5. The system of claim 1, wherein the MCC is associated with a car rental merchant or a travel merchant.

6. The system of claim 1, wherein the one or more benefits comprise one or more of insurance coverage, reward points, travel miles, rebates, or combinations thereof.

7. A system for preventing unnecessary payments, comprising:
    one or more processors; and
    a memory in communication with the one or more processors and storing instructions that, when executed by the one or more processors, are configured to cause the system to:
        receive a signal indicative of a first event in which a first user device associated with a first user navigates to a webpage of a first merchant;
        responsive to receiving the signal:
            identify a merchant category code (MCC) associated with the first merchant;
            determine whether one or more benefits related to the MCC are associated with one or more accounts of the first user;
            responsive to determining the one or more benefits related to the MCC are associated with the one or more accounts of the first user:
                identify whether the webpage comprises one or more first options associated with the one or more benefits;
                responsive to determining the webpage comprises the one or more first options associated with the one or more benefits:
                    automatically block the first user from selecting the one or more first options by:
                        modifying a graphical user interface (GUI) of the first user device to generate a modified GUI by re-formatting one or more selectable user input objects in the GUI from a first format to a second format; and
                        causing the first user device to display the modified GUI; and
                    transmit a first message to the first user via the first user device, the first message providing the one or more benefits.

8. The system of claim 7, wherein the instructions are further configured to cause the system to:

receive a notification of a pending purchase made by the first user, the pending purchase associated with the first merchant; and automatically transmit a second message to the first user device, the second message providing a suggestion that the first user may have made an unnecessary payment and the one or more benefits.

9. The system of claim 8, wherein the first message and the second message comprise one or more of an email, an SMS message, a push notification, an in-application message, or combinations thereof.

10. The system of claim 7, wherein the first message comprises an option for the first user to prevent the system from automatically blocking the first user from selecting the one or more first options.

11. The system of claim 7, wherein automatically blocking the first user from selecting the one or more first options comprises greying out one or more data fields on the webpage.

12. The system of claim 7, wherein the one or more first options are associated with purchasing insurance.

13. The system of claim 7, wherein the MCC is associated with a car rental merchant or a travel merchant.

14. The system of claim 7, wherein the one or more benefits comprise one or more of insurance coverage, reward points, travel miles, rebates, or combinations thereof.

15. A system for preventing unnecessary payments, comprising:
one or more processors; and
a memory in communication with the one or more processors and storing instructions that, when executed by the one or more processors, are configured to cause the system to:
receive a first notification of a pending purchase associated with a first user and an online merchant;
identify a merchant category code (MCC) associated with the first notification;
determine that one or more benefits related to the MCC are associated with one or more accounts of the first user;
determine whether the first notification relates to the one or more benefits; and
responsive to determining the first notification relates to the one or more benefits:
modify a graphical user interface (GUI) of a user device associated with the first user to generate a modified GUI by re-formatting one or more selectable user input objects in the GUI from a first format to a second format;
cause the user device to display the modified GUI; and
automatically transmit a first message to a first user device associated with the first user, the first message providing the one or more benefits.

16. The system of claim 15, wherein the instructions are further configured to cause the system to:
receive a second notification indicating the pending purchase was completed; and
transmit a second message to the first user device, the second message providing a suggestion that the first user may have made an unnecessary payment and the one or more benefits.

17. The system of claim 16, wherein the first message and the second message comprise one or more of an email, an SMS message, a push notification, an in-application message, or combinations thereof.

18. The system of claim 15, wherein the instructions are further configured to cause the system to:
automatically block the pending purchase in response to determining that the first notification relates to the one or more benefits.

19. The system of claim 15, wherein the one or more benefits comprise one or more of insurance coverage, reward points, travel miles, rebates, or combinations thereof.

* * * * *